Patented May 3, 1932

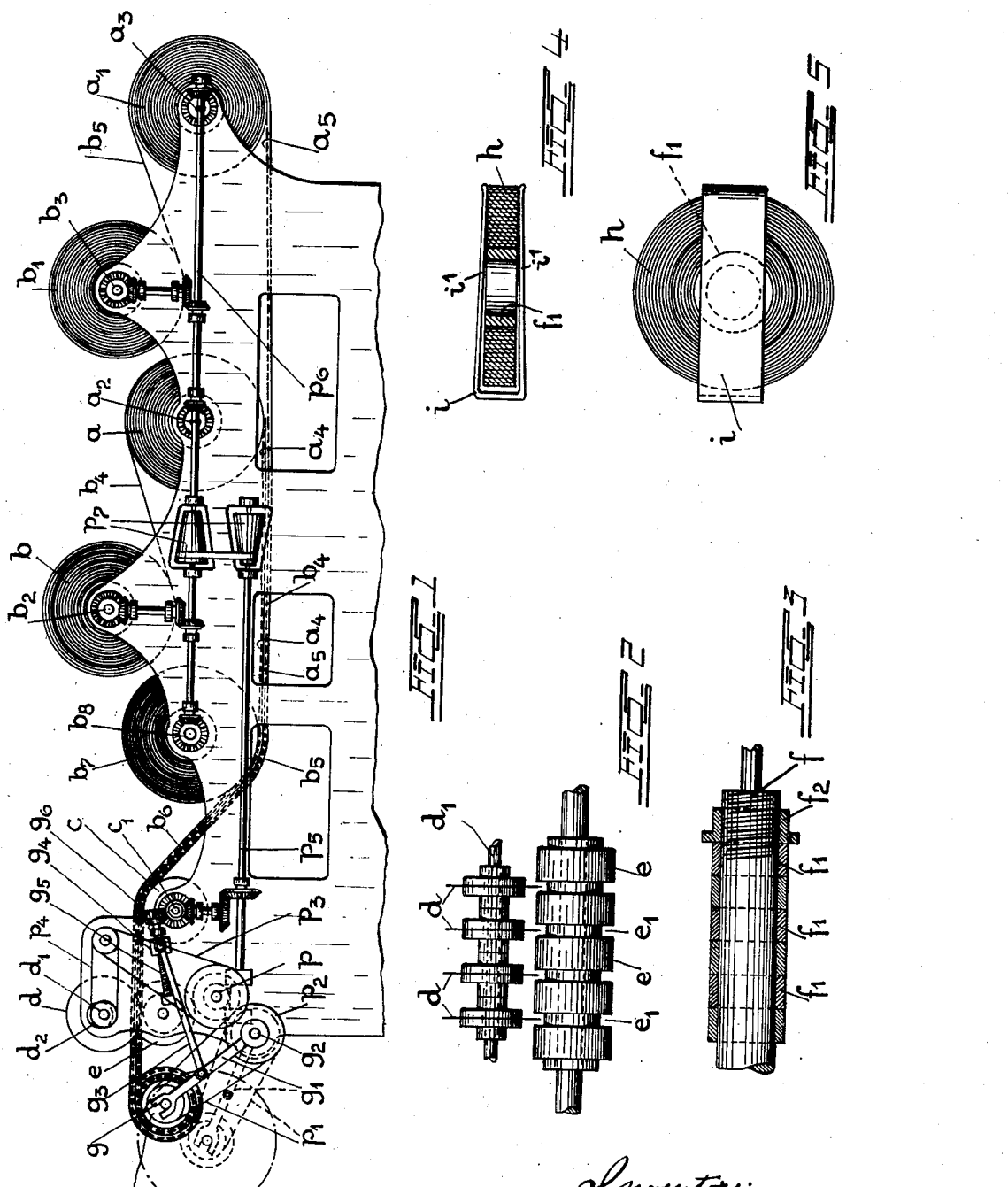

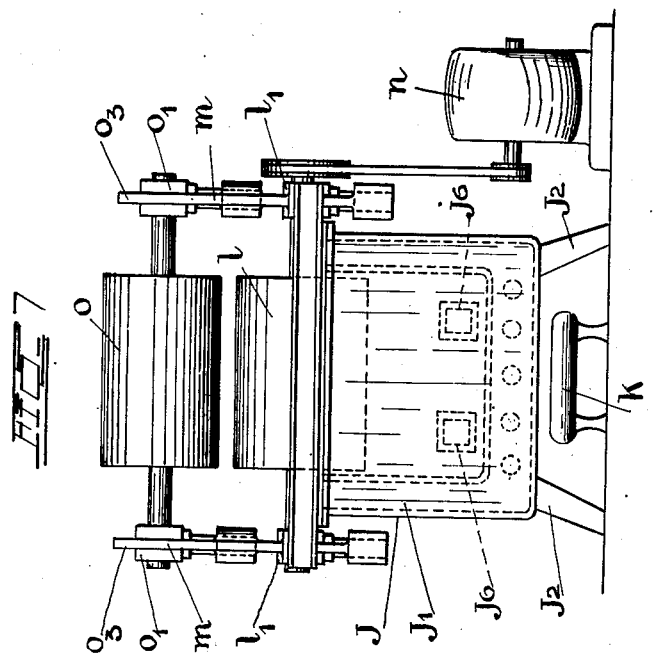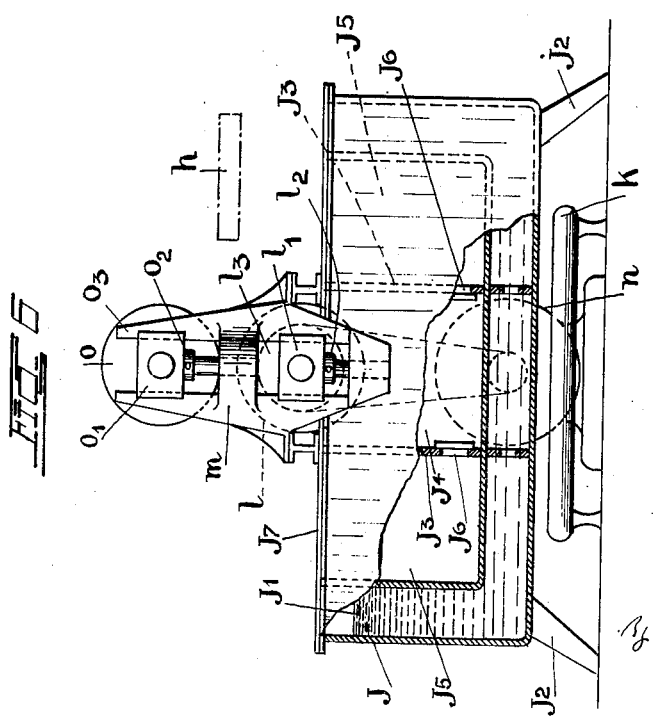

1,856,823

UNITED STATES PATENT OFFICE

BORIS AIVAZ, OF BUDAPEST, HUNGARY

PRODUCTION OF SUPPLY SPOOLS OF STRIP MATERIAL

Application filed December 6, 1928, Serial No. 324,165, and in Great Britain December 8, 1927.

This invention relates to the production of supply spools of material comprising crepe or corrugated paper, and especially of an extensible material comprising alternating layers of crepe or corrugated paper and an absorbent substance such as loose or unwoven or matted cellulose fibres, paper wadding or the like, such as is described in my co-pending application No. 33276/27.

For the economical production of effective filter wads it is necessary to use supply spools of such material in which the creping, stiffness and other characteristics of the composite strip are substantially constant throughout the spool. It is furthermore essential that the intervening layer or layers of absorbent material should not be subjected to any substantial degree of stretching while they are being applied between the layers of crepe or corrugated paper in the formation of the supply spools, or subsequently in the production of the wads, otherwise the layer of absorbent substance will become torn or otherwise unevenly distributed with the result that the filtering properties of the wads will be impaired. It is also important that the crepe or corrugated paper should not be subjected, during the formation of the supply spools, to any substantial degree of stretching that would substantially reduce that creping or corrugations and that the creping should be substantially uniform throughout.

The present invention has among its objects to provide effective means by which the layer or layers of absorbent substance, such as loose, unwoven or matted cellulose fibres, paper wadding or the equivalent, may be applied upon or between the layers of crepe or corrugated paper so as to form the composite material, and to provide simple and effective means whereby a coating of adhesive, preferably comprising a fire-proofing or impregnating substance, may be applied upon one side of the supply spool for the purpose of preventing unwinding, deformation or displacement thereof during transport and of impregnating with fire-proofing substance the edge of the strip, which when formed into a wad is disposed adjacent the filling of tobacco.

According to the present invention the layers of crepe or corrugated paper and of absorbent substance are withdrawn from supply rolls which may be rotated in unison at a suitable speed and are associated together in such manner that the layer or layers of absorbent substance is or are applied upon or between the layers of crepe or corrugated paper without any tendency of the layer or layers of absorbent substance to tear or become stretched. For this purpose the layers of crepe or corrugated paper upon which the absorbent substance is applied may be caused to pass around the respective supply rolls of the absorbent substance so that the layers of the latter become applied upon, and adhere to, the respective layers of crepe or corrugated paper before leaving their respective supply rolls. The layers of crepe or corrugated paper with the absorbent material applied thereon are combined together into a composite strip or band and a further layer of crepe or corrugated paper is applied upon the exposed layer of absorbent substance so as to complete the composite strip or band of material, which is subsequently, by known means, cut into parallel strips or ribbons of suitable width and rolled or wound to form supply spools.

For the purpose of facilitating the application of the coating of adhesive to one side of the supply spool, a spring clip or the equivalent is applied upon each spool, on its withdrawal from the cutting and rolling or winding mechanism. The spool is introduced edgewise between a pair of co-operating rollers, one of which dips into a suitable adhesive solution such as hereinafter described, the spring clip or the equivalent being withdrawn as the spool passes between the rollers. After the spool has received the coating of adhesive, it is removed, preferably on a flat plate or tray, and allowed to dry, whereupon it may be handled and transported without unwinding or deformation.

The invention is hereinafter described by way of example with reference to the accompanying diagrammatic drawings, in which:—

Figure 1 is a side elevation illustrating a machine according to the invention for producing supply spools of composite material, such as before referred to, comprising three layers of creped or corrugated paper with two intervening layers of absorbent substance.

Figure 2 is a detail view in end elevation illustrating the cutting device.

Figure 3 is a detail view in longitudinal section illustrating the construction of the winding roll.

Figures 4 and 5 are views, in cross section and side elevation respectively, of a supply spool provided with a retaining clip, and Figures 6 and 7 are views, in part sectional side elevation and in end elevation respectively, showing a suitable form of machine for use in coating one side of the supply spools with an adhesive.

In carrying the invention into effect according to one preferred embodiment adapted for the production of supply spools of composite material comprising, for example, five alternating layers of crepe or corrugated paper and an absorbent substance such as loose, unwoven or matted cellulose fibres or the equivalent, i. e. three layers of crepe or corrugated paper with two intervening layers of the absorbent substance, and with reference to Figures 1, 2 and 3 of the accompanying diagrammatic drawings, the supply rolls $a$, $a^1$ of the absorbent substance may be supported on parallel spindles $a^2$, $a^3$ disposed substantially in the same horizontal plane, while the supply rolls $b$, $b^1$ for the two lower layers of the crepe or corrugated paper may be supported upon spindles, $b^2$, $b^3$, disposed somewhat above and at the rear, or at the front of the spindles $a^2$, $a^3$ carrying the rolls $a$, $a^1$ of absorbent material. The respective layers $b^4$, $b^5$ of crepe or corrugated paper are led from the under side of the two supply rolls $b$, $b^1$ referred to and are passed over and round the respective supply rolls $a$, $a^1$ of absorbent substance, and thence led in a direction for example opposite to the direction of their withdrawal from the respective supply rolls $b$, $b^1$. By such means the layers $b^4$, $b^5$ of crepe or corrugated paper are pressed lightly upon the respective layers $a^4$, $a^5$ of the absorbent substance before the latter are withdrawn from their respective supply rolls $a$, $a^1$ so that thus, the layers $b^4$, $b^5$ of crepe or corrugated paper serve as carriers or backings to which the respective layers $a^4$, $a^5$ of the absorbent substance adhere and by which they are drawn off from their supply rolls $a$, $a^1$. It is important that no substantial tension should be exerted upon the layers $b^4$, $b^5$ of crepe or corrugated paper during or after the application of the absorbent substance thereon, otherwise the layers $a^4$, $a^5$ of the absorbent substance will become torn or will be irregularly applied whereby the supply spools produced, and consequently the wads, will not be constant as regards their absorbent properties.

The supply rolls are so arranged that the two layers $b^4$, $b^5$ of crepe or corrugated paper having the layers $a^4$, $a^5$ of absorbent substance applied thereon in the manner described may be led together or combined to form a composite material, and in order to complete the composite material an additional layer $b^6$ of crepe or corrugated paper is withdrawn from a supply roll $b^7$ and laid or applied upon the upper exposed layer $a^4$ of absorbent substance. The machine may be modified to produce a composite material comprising more or less than five layers, for example three or seven.

The composite material comprising the three layers $b^4$, $b^5$, $b^6$ of crepe or corrugated paper and the two intervening layers $a^4$, $a^5$ of absorbent substance is conducted to cutting and winding mechanism of any suitable form. According to one construction the composite material may be led over a roller $c$ to a cutting device by which the length of material is cut into parallel strips or ribbons of suitable width. The cutting device may consist, as shown in Figures 2 and 3, of a plurality of disc cutters $d$ mounted upon a rotatable shaft $d^1$ and co-operating with circumferential grooves $e^1$ or recesses in a cylindrical matrix $e$ disposed beneath, means being preferably provided whereby the cutters $d$ may be raised out of action as by mounting the supporting shaft $d^1$ in eccentrics $d^2$, as to permit the introduction of a fresh length of composite material through the cutting device for attachment to the winding roll $f$ or the equivalent. The latter may comprise a spindle mounted in suitable bearings $g$ and disposed parallel with the shaft $d^1$ upon which the cutters $d$ are mounted, the spindle $g$ being adapted to receive a plurality of ring-like formers $f^1$ of cardboard or the like, of a width corresponding to the width of the ribbons or strips aforesaid, the formers $f^1$ being clamped upon the spindle $g$ for example by means of a screw threaded collar $f^2$ or the equivalent. Mechanism may be provided whereby the distance between the winding roll $f$ and the cutting device may be automatically increased as the diameter of the material upon the winding roll $f$ increases and preferably so that the parallel ribbons or strips of material are withdrawn from the cutting devices substantially horizontally. Thus, the bearings $g$ carrying the winding roll $f$ may be mounted at the ends of a pair of arms $g^1$ fixed at their lower ends upon a rotatable shaft $g^2$ and the arms $g^1$ may be supported, in such position that the top of the roll $f$ is substantially on a level with the top of the matrix $e$ of the cutting device, by means of tension rods $g^3$ pivoted to the arms $g^1$ and to blocks $g^4$ or the like mounted upon a screw threaded shaft $g^5$ carried in suitable thrust bearings and rotated, in accordance with the rate of feed of the material through the cutting device, as by means or worm and worm wheel gearing $g^6$ from the shaft $c^1$ carrying the roller $c$. By such means the winding roller $f$ may be permitted to move gradually away from the cutting device and downwardly, as indicated in dotted lines, so that the material is withdrawn from the cutting device at all times substantially horizontally. The winding roller $f$ may be driven from a main driving shaft $p$ by means of belt and spur gearing $p^1$, $p^2$ operating through a very lightly loaded clutch, or other means may be provided so that the material is withdrawn from the cutting device under very light tension. The cutters $d$ may be similarly driven by a belt or chain drive $p^3$, $p^4$ from the driving shaft $p$. The supply rolls $a$, $a^1$, $b$, $b^1$, $b^7$ may be positively rotated in unison. For example, a longitudinally extending shaft $p^5$ may be driven from the driving shaft $p$ by means such as worm and worm wheel gearing and may drive a second longitudinally extending shaft $p^6$ through variable gearing such as a pair of coned pulleys $p^7$. This second shaft $p^6$ may be directly geared to the shafts $b^8$, $a^2$, $a^3$ carrying the rolls $b^7$, $a$ and $a^1$ respectively, as by means of bevel gearing, and may also drive the shafts $b^2$, $b^3$ carrying the rolls $b$, $b^1$ as by means of bevel gearing and intermediate vertical shafts. Alternatively only the supply rolls $b$, $b^1$, $b^7$ of crepe or corrugated paper may be so driven, the necessary rotation of the supply rolls $a$, $a^1$ of absorbent substance being effected by the engagement of the layers $a^4$, $a^5$ of crepe or corrugated paper around them. If desired the drive to the rolls $a$, $a^1$ or to any or all of the supply rolls may be transmitted through very lightly loaded clutches to allow for the difference in thickness of the respective materials. The roller $c$ may be driven from the shaft $p^5$ as by means of bevel gearing and an intermediate vertical shaft, and the whole mechanism is so arranged and operated that no substantial tension is imposed upon the separate layers of material or upon the composite material at any position in the machine. The variable gear connecting the two shafts $p^5$, $p^6$ may be automatically controlled by any suitable means to compensate for the gradually decreasing diameter of the supply rolls of material, or the necessary adjustment may be made by hand.

In the operation of the machine the composite material is conducted through the cutting device, the cutters $d$ of which have been raised out of action, and is secured, for example by means of adhesive or pins, to the series of formers $f^1$ clamped upon the winding spindle $f$, it being understood that the formers $f^1$ are disposed in accurate lateral register with the cutters $d$. The machine is set in operation and the cutters $d$ are immediately lowered into the working position. Thus it will be understood that the leading part of the length of composite material that is wound upon the formers $f^1$ is not cut longitudinally into ribbons or strips, but may be readily broken away or separated when the spools carried by the formers $f^1$ are removed from the winding spindle $f$.

On the completion of the winding operation the machine is stopped and the supply spools $h$ carried by the ring-like formers $f^1$ are removed from the winding spindle $f$ one by one, a spring clip $i$ (such as shown in Figures 4 and 5) being applied to each spool $h$ to retain its form while a coating of adhesive is applied to one side thereof as hereinafter described. The spring clip $i$ according to one simple form may consist of a strip of spring sheet metal bent to a U form corresponding substantially to the cross-section of the spool $h$. The parallel disposed parts $i^1$ of the spring clip are preferably diverted slightly inwardly towards one another so as to engage the opposite sides of the spool $h$ with sufficient pressure to prevent the latter from unrolling or becoming displaced or deformed, it being understood that the spools $h$ are only lightly wound and that if removed without the use of some retaining means such as described they would immediately spring open or become displaced or deformed to such an extent as to render them unsuitable for use in the wad forming machines described in my co-pending applications before referred to.

In order to preserve the shape of the supply spool $h$, as, for example, during transport and when in position on the wad-forming machine, it is preferred to apply a coating of an adhesive to one face of the spool. The coating is preferably regulated so that the impregnation or absorption of the solution into the absorbent layers of the material extends for about 2 mms. from the edge inwardly. It has been found that if the absorption of the adhesive extends too far from the edge of the material, tearing of the layers of material may result during the wad forming operations. In order to secure an even coating of the adhesive, in which the impregnation extends to the desired depth, it is advantageous to use the apparatus hereinafter described with reference to Figures 6 and 7.

A tank or vat $j$, preferably rectangular, is provided with a heating jacket $j^1$ containing water which is maintained for example at boiling point by means such as gas burner $k$ disposed beneath. The tank or vat $j$ may be supported upon suitable feet $j^2$ for example to a table as by screws. A cylindrical roller $l$ is supported in bearings $l^1$ slidable vertically in guides $l^3$ in suitable standards $m$ at the sides of the tank or vat $j$ so as to extend transversely across the latter conveniently in a middle position and so that the lower half of its periphery may dip into an adhesive solution, such as hereinafter described, contained within the tank or vat $j$. The roller $l$ is preferably constructed of hard wood, or may be covered with hard rubber or with felt and is preferably driven at a constant slow or moderate speed by a suitable motor $n$. A freely rotatable roller $o$ is mounted in bearings $o^1$, slidable vertically in guides $o^3$ in the standards $m$, to extend vertically above and parallel with the driven roller $l$ and means such as turn screws $l^2$, $o^2$ are provided whereby the rollers $l$, $o$, may be adjusted vertically to vary the extent to which the driven roller $l$ dips into the adhesive and to vary the clearance between the rollers $l$, $o$, which clearance preferably corresponds exactly to, or is slightly less than the thickness of the spool $h$. The spool $h$ to be coated is fed between the rollers $l$, $o$ by hand at such rate that the desaid degree of coating or impregnation is secured, the spring clip $i$ hereinbefore referred to being simultaneously withdrawn. The thickness of the coating or the degree of impregnation may be regulated to some extent by varying the clearance between the rollers $l$, $o$, so that more or less pressure may be applied upon the spool $h$, in its passage between the rollers, the thickness of coating or the degree of impregnation increasing with the pressure applied. It is preferable to feed the spool $h$, between the rollers $l$, $o$ so that it is retarded with respect thereto, so that a frictioning effect is secured.

The tank or vat $j$ is preferably provided with a transverse partition or partitions $j^3$ by which it is divided into compartments, to one $j^4$ of which the driven roller $l$ has access, while the remaining compartment or compartments $j^5$ serve as reserve tanks containing a fresh supply of heated adhesive which may pass, or be introduced, into the working compartment $j^4$ when required, as for example when the level of the adhesive therein falls or when the adhesive becomes too dirty for further use and has to be removed. Valved openings may be provided in the partition or partitions $j^3$ so that the reserve supply of heated adhesive may be cut off while the working compartment $j^4$ is being cleaned out, and to prevent admixture of the dirty adhesive with the fresh clean supply. The reserve compartment or compartments $j^5$ may communicate with the working compartment $j^4$ through non-return valves $j^6$ or strainers so that while fresh adhesive may flow into the working chamber $j^4$ as the level falls therein, backflow of foreign matter or of dirty adhesive into the fresh supply may be obviated. Fresh adhesive solution may be supplied to the reserve compartment or compartments $j^5$ by ball float valve mechanism or other means whereby the level of the adhesive in the tank or vat $j$ may be automatically maintained substantially constant. The tank or vat $j$ is preferably covered in at the top as by means of a lid $j^7$ except for an aperture through which the driven roller dips into the adhesive.

It will be understood that the invention is not limited to the construction of apparatus described for the coating of the spools. Thus an endless band dipping into the adhesive could be used in conjunction with the driven roller. Furthermore the apparatus may be modified in such manner that a waterproofing solution may be applied to the other face of the spool, but this is in general not desired.

A suitable adhesive solution for coating the supply spools may consist of: 200 g. aluminum sulphate, 500 g. water, 200 g. yellow dextrin, 500 g. water. Such an adhesive composition dries into a crystalline form which is adapted to crumble and fall away during the operations of forming the wad so that the longitudinal passages through the wad are not obstructed and there is no liability of the adhesive imparting disagreeable taste to the cigarette. Furthermore the aluminium sulphate or the equivalent which is absorbed into the edge of the absorbent material serves to fire-proof the end of the wad which becomes disposed adjacent the filling of tobacco, so that cigarette ends may be prevented from smouldering for any substantial time and any possibility of burning or smoking the paper after the tobacco is consumed may be obviated.

It is desirable to avoid the use of fireproofing chemicals which are liable to dissociate under the action of heat to produce noxious or deleterious fumes or a disagreeable taste at the conclusion of the smoke. For use in cigarette holders and the like the fireproofing chemicals may be dispensed with.

By the use of supply spools according to the invention, effective filter wads may be economically produced in large quantities in which the creping or corrugating of the unabsorbent paper and the even distribution of the absorbent substance, and consequently the quality of the filter wads produced, remain substantially constant.

What I claim is:

1. Apparatus for producing composite material of paper and an adsorbent, comprising a supply roll for the absorbent substance, a supply roll for the paper, arranged in such manner that the layer of paper may be led around the supply roll of the absorbent substance to receive the layer of the latter without tearing or stretching thereof, an additional supply roll for paper arranged for the application of a further layer of paper upon the exposed layer of the absorbent substance, cutting mechanism for cutting the composite material into parallel strips, and means comprising a winding spindle carrying a plurality of cylindrical formers for winding the resulting strips of composite material into supply spools.

2. An apparatus for producing composite material of paper and an absorbent comprising a supply roll for the absorbent substance, a supply roll for the paper arranged in such manner that the layer of paper may be led around the supply roll of the absorbent substance to receive the layer of the latter without tearing or stripping thereof, an additional supply roll for paper arranged for the application of a further layer of paper upon the exposed layer of the absorbent substance, cutting mechanism for cutting the composite material into parallel strips, means comprising a winding spindle carrying a plurality of cylindrical forms for winding the resulting strips of composite material into supply spools, means for driving the supply rolls, means for feeding or conveying the material, means for winding the material and said driving, feeding and winding means being driven in such manner that any substantial tension upon the material is avoided.

In testimony whereof I affix my signature.

BORIS AIVAZ.